United States Patent [19]

Chambost et al.

[11] 3,710,542
[45] Jan. 16, 1973

[54] APPARATUS FOR FILLING A SAUSAGE SKIN WITH SLICED SAUSAGE FILLING

[76] Inventors: Pierre Chambost, route de Valsonne; Aime Chambost, Box 32, Boulevard Voltaire, both of Tarare, France

[22] Filed: Sept. 22, 1970

[21] Appl. No.: 74,452

[30] Foreign Application Priority Data

Sept. 23, 1969 France..................................6932286

[52] U.S. Cl.......................................53/123, 99/109
[51] Int. Cl..............................................B65b 63/00
[58] Field of Search ...........................53/123; 17/35

[56] References Cited

UNITED STATES PATENTS

| 1,337,374 | 4/1920 | Vail et al. | 53/123 X |
| 3,462,793 | 8/1969 | Sumption | 53/123 X |

*Primary Examiner*—Travis S. McGehee
*Attorney*—Robert E. Burns, Emmanuel J. Lobato and Allen Zelnick

[57] ABSTRACT

An apparatus for filling a sausage casing with a sliced sausage filling, includes a movable endless conveyor on which is fixed a plurality of spaced, support members. Each support member has a web interconnecting opposed side flanges. Guides extend between the side flanges for slidably supporting a guide block. The guide block has a through bore, axially aligned with a through bore of a member rigidly attached to the guide block. A slot is formed in the guide block and extends transversely of and communicates with the through bore in the guide block. First and second bars are slidably attached to the web. The first bar, in a first position of the guide block, places a sausage casing in the bore of the member. The second bar, in a second position of the guide block, intermittently feeds sausage filling through the bore of the guide block passed the slot into the sausage casing. The disclosure also relates to a method of making a sausage filled with a sliced filling. A cutter, has a cutting edge portion which extends into the slot to slice the sausage filling before entry of the sausage filling into the sausage casing.

12 Claims, 5 Drawing Figures

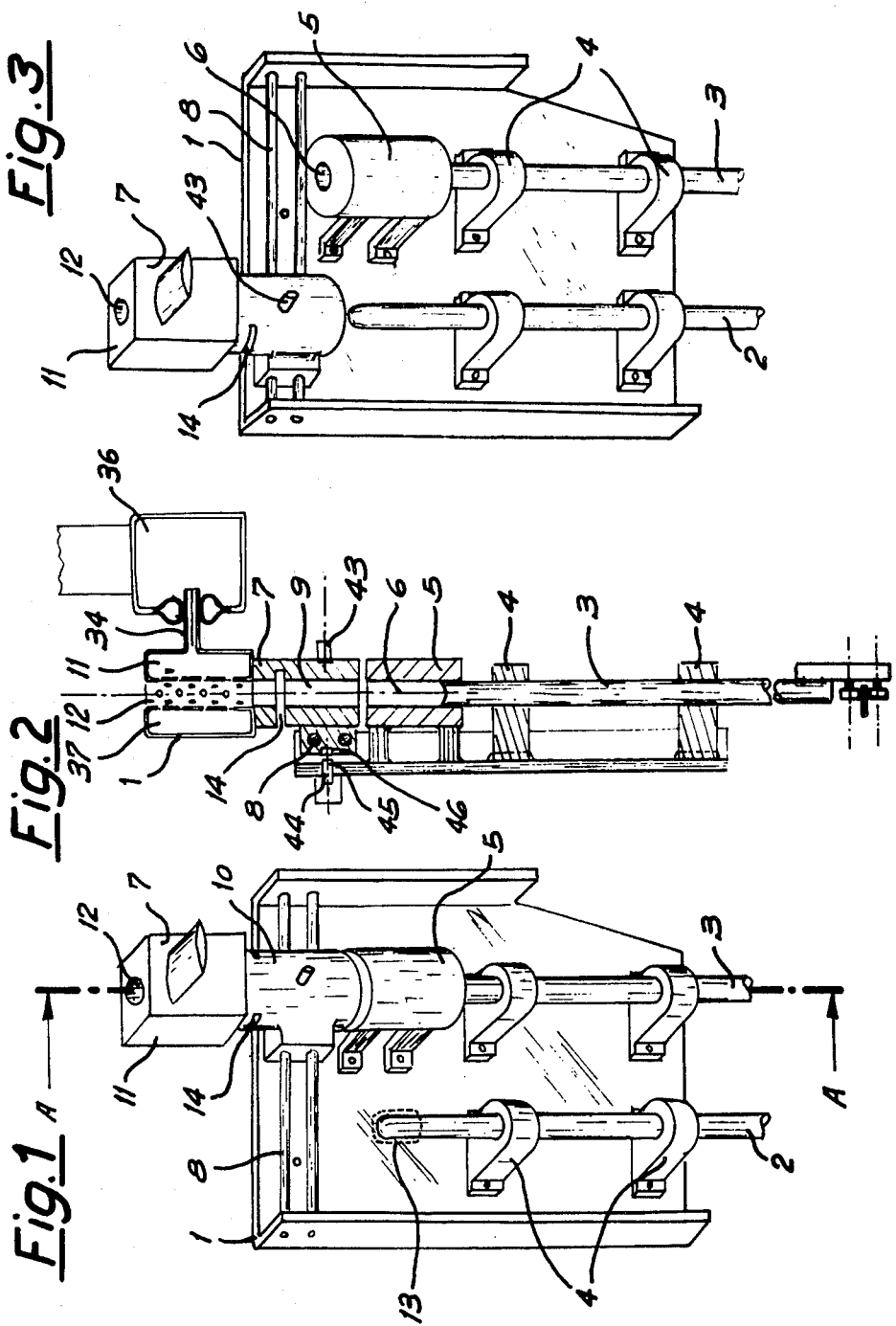

3,710,542

APPARATUS FOR FILLING A SAUSAGE SKIN WITH SLICED SAUSAGE FILLING

BACKGROUND OF THE INVENTION

The invention relates to an apparatus for filling a sausage skin with a sliced sausage filling and to a method of making a sausage comprising a sausage skin filled with a sliced sausage filling.

In order to obtain and conserve acceptable qualities of a sausage filling when said filling is cut into slices, it is necessary that the slices of sausage filling be maintained in tight contact with each other in order to avoid the presence of air which can lead to the filling going bad.

This necessitates that the slicing and the filling of the sausage skin by the sliced filling be performed in a continuous operation, allowing each slice to remain after cutting, in the position it had before cutting, with an exact superpositioning of the cut surfaces.

This is not possible when the slicing and filling operations occur separately.

SUMMARY OF THE INVENTION

An object of the present invention is the provision of an apparatus for filling a sausage skin with a sliced sausage filling in which each slice of the sausage filling is in intimate contact with an adjacent slice or adjacent slices to substantially minimize the possibility of the sausage filling going bad.

A further object of the present invention is the provision of a simple, inexpensive method of making a sausage having a sausage skin filled with a sliced sausage filling.

According to one aspect of the present invention, an apparatus for filling a sausage skin with a sliced sausage filling, comprises a carriage having a hole, and a slot extending transversely of and communicating with the hole, means for positioning a sausage skin in the hole with an open end of the skin adjacent the slot, means for maintaining the skin in the hole, means for intermittently feeding a sausage filling through the hole and passed the slot, into the sausage skin through said open end of the skin, a cutter, a cutting edge portion of which cutter extends into the slot to slice the sausage filling before entry of the sausage filling into the sausage skin and means for discharging the sausage skin filled with sliced sausage filling from the hole in the carriage.

In a preferred embodiment the apparatus includes a generally channel-shaped support member having a web interconnecting opposed side flanges, guides extending between the side flanges, on which guides, the carriage is slidably supported, the carriage being movable between a first position in which the hole is in alignment with the sausage skin positioning means and a second position, in which the hole is in alignment with the sausage filling feeding means, the sausage skin positioning means and the sausage filling feeding means, each being in the form of an elongate bar slidable within the hole, the sausage filling feeding bar also being slidable in the hole to discharge the sausage skin filled with sliced sausage filling from the hole, the bars being mounted on the support member for sliding movement in a direction substantially at right-angles to the direction of movement of the carriage.

According to a second aspect of the present invention a method of making a sausage comprises a sausage skin filled with a sliced sausage filling, comprises the steps of making the filling in a mould of regular shape, stocking the filling to prevent elongation of the filling, drying the filling, slicing the filling and intimately superimposing the sliced pieces of filling, introducing the superimposed sliced pieces of filling into a thermo-shrinkable skin and closing the skin under a vacuum.

DESCRIPTION OF THE FIGURES OF THE DRAWING

An embodiment of the invention will now be described, by way of example, reference being made to the Figures of the accompanying drawings in which:

FIG. 1 is a perspective view of a support member forming part of the apparatus of the present invention, with various elements of the apparatus, including a carriage, attached thereto;

FIG. 2 is a cross-section on the line A—A of FIG. 1;

FIG. 3 is a perspective view of the support member of FIG. 1 with the carriage in a different position on the support member;

DESCRIPTION OF PREFERRED EMBODIMENTS

Figure 4:
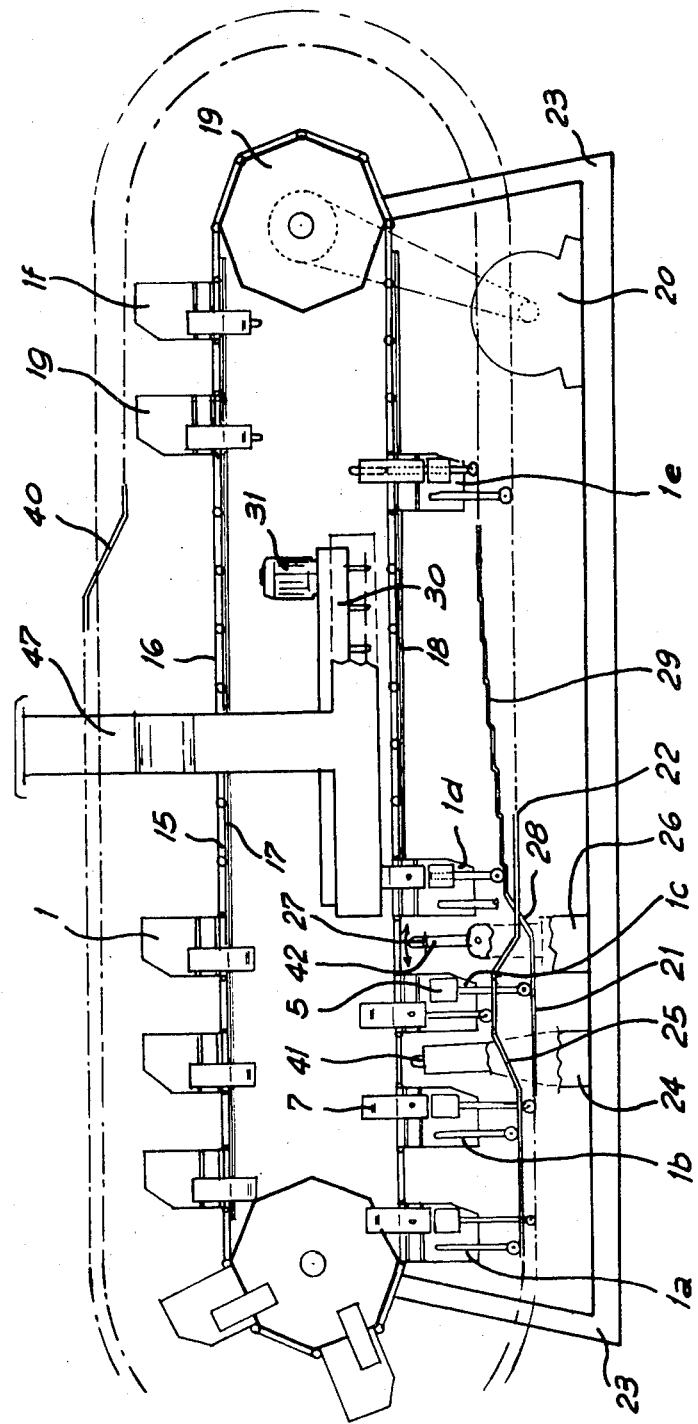
FIG. 4 is a diagrammatic side view of the apparatus of the invention.

As shown in FIGS. 1, 2 and 3, an apparatus for filling a sausage skin with a sliced sausage filling includes a support member 1 having a web interconnecting opposed side flanges to define a generally channel-shape. Guides 8 extend between the side flanges. A carriage 7 is slidably supported on the guides 8 and includes a guide block 10 to which is rigidly attached a member 11 for movement therewith.

The guide block 10 has an axial through bore 9 and a slot 14 arranged transversely of and communicating with the through bore 9. A stop pin 43 extends outwardly from the guide block 10 and the side of the guide block 10 adjacent the support member 1 has an aperture 46.

The member 11 is generally cylindrical and has a through bore 12 in axial alignment with the through bore 9. The side wall of the through bore 12 has perforations which communicate with the interior of an annular chamber 37 formed in the member 11. A hollow beak-like arm 34, communicating with the interior of chamber 37, extends from the member 11 between two lips 35 of resilient material of a conduit 36. The conduit 36 communicates with a vacuum pump (not shown) via a duct 47 (see FIG. 4).

A pin 44 is slidably mounted in the web of the support member 1 and is positioned for engagement with the aperture 46 as will be explained later.

Two spaced parallel bars 2, 3 are slidably mounted in pairs of lugs 4 attached to the web of the support member 1. Immediately above the bar 3, (as seen in FIGS. 1 and 3), a container 5 is attached to the web of the support member 1, which container 5 has an axial hole 6 for slidably receiving the bar 3.

Figure 5:
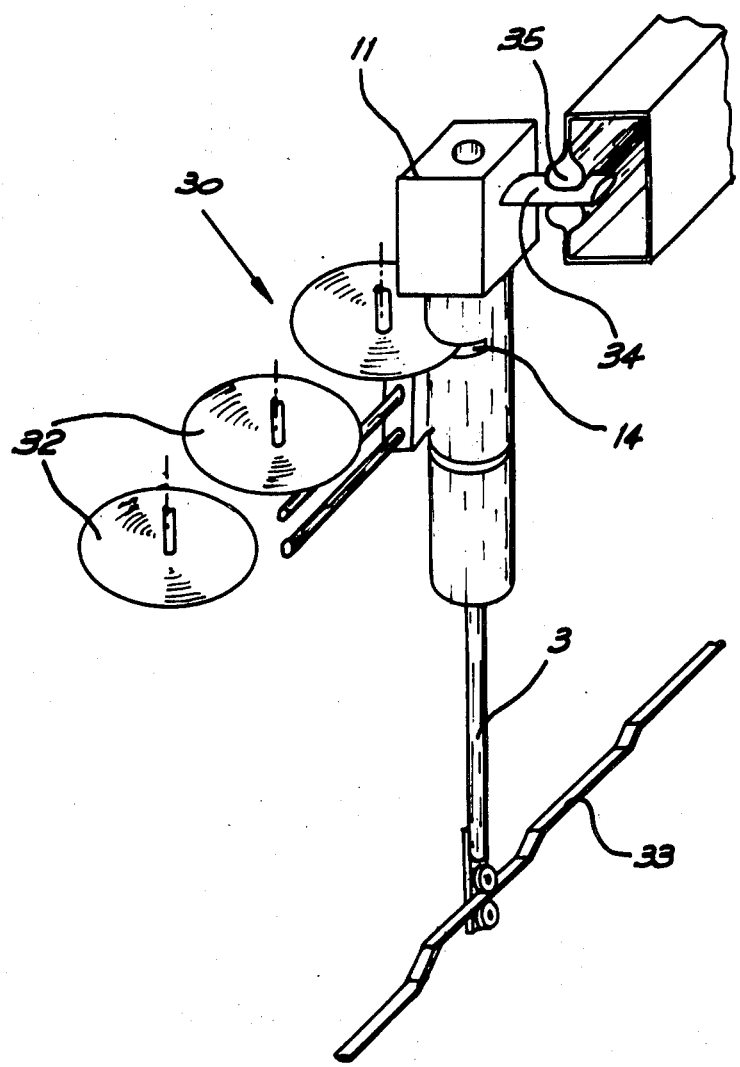
FIG. 5 is a perspective detail illustrating part of the apparatus of the invention.

Referring now, more particularly to FIGS. 4 and 5, the support member 1 is one of a plurality of substantially identical support members mounted for movement on an endless conveyor belt. The conveyor belt is in the form of a chain 15 having links 16 each of sufficient length to permit their rigid connection to a support member 1. The chain slides along guide supports 17 and 18 and extends over two spaced wheels 19 of generally polygonal cross-section, the sides of which wheels are of a length substantially equal to the length of a link 16. One of the wheels 19 is driven by a motor 20. Each support member 1 is spaced from adjacent support members 1 by a link 6.

Movement of the bars 2 and 3 is controlled by cam surfaces 21 and 22 mounted on a frame 23 which also supports the wheels 19, guide supports 17, 18 and all the remaining non-moving elements of the apparatus.

The ends of the bars 2 and 3 remote from the carriage 7 are provided with wheels or cam followers which engage on both sides of their respective cam surfaces 21 and 22 (see FIG. 5).

Two stops, a fixed stop 24 and a movable stop 26 are mounted on the frame 23 adjacent the lower path of the chain 15.

The movable stop 26 has an arm 42 carrying a movable element 27 and the stop 24 a movable arm 41.

A cutter device 30 is mounted adjacent the lower path of the chain 15 downstream of the stops 24, 26 (as seen in FIG. 4). The cutter device includes three rotatable, spaced, aligned circular cutters 32, each having a thickness which permits the entry of the cutter periphery into the side slot 14. The cutters 32 are driven by a motor 31.

In operation, the chain 15 is caused to rotate, by motor 20 and the driven wheel 19, in an anti-clockwise sense as seen in FIG. 4. The chain 15 carries with it the plurality of support members 1.

In the position 1a the support member 1 and all the elements carried thereby are in a position ready to start a cycle of operations with both bars 2, 3 in their lowermost positions relative to the carriage 7 and with the carriage 7 is a second position in alignment with the bar 3.

The support member 1 moves to a position 1b, where a sausage skin or casing 13 is placed, by an operator, over the end of the bar 2. Between positions 1b and 1c, the arm 41 of stop 24 engages the stop pin 43, to cause, by the continued movement of the support member 1, the carriage 7 to assume a first position in alignment with bar 2. At the same time, the bar 2 is caused to rise, by an inclined portion 25 of the cam surface 22, so that the upper end of bar 2 together with the sausage skin 13 passes through the bore 9 and into the bore 12.

The operator, simultaneously, puts a sausage filling in the hole 6 of container 5, the end of bar 3 prevents the sausage filling from falling through the hole 6.

The support member then moves from position 1c to position 1d during which movement the movable element 27 engages the carriage 7 to return the carriage 7 to the second position. This movement of the carriage 7 is carried out after the bar 2 has been retracted from the carriage 7 by engaging a downwardly inclined part of the cam surface 22.

In the position 1d, the arm 34 extends between the lips 35 and the chamber 37 is subjected to a reduced pressure which causes the wall of the skin 13 to be held tightly against the wall of the bore 12. The length of the conduit 36 (FIG. 1) is generally equal to the length of the cutting device 30, that is to say, chamber 37 has a reduced pressure corresponding to the cutting and subsequently to the introduction of sliced sausage in the skin.

Between positions 1d and 1e, the bar 3 is caused to be raised intermittently by engagement with a series of steps 29 formed in the cam surface 21. This causes the sausage filling to be driven through the bore 9 passed the slot 14. Cutters 32 rotated by motor 31, in turn, enter the slot 14 as the support member passes their position so that the sausage filling is sliced.

At position 1e, the bar 3 extends sufficiently into the carriage 7 so that the end of the sausage 38 protrudes through the top of the bore 12. The skin or casing 13 is completely filled with sliced sausage filling. The packed sausage can then be recovered. However, the sausage can be removed from the carriage 7 at positions 1g or 1f of the support member 1 which permits a simpler recovery.

When the recovering operation is finished, the cam surface 21 has an inclined portion 40, which disengages bar 3 from the bores 9 and 12 of the carriage 7, thus preparing support member for a new cycle, of operations.

The fixed stop 24 and movable stop 26 are provided with arms 41 and 42 which act on the stop pin 43 of the carriage 7. In the first case, it is the forward movement of support member 1 which causes the movement of carriage 7 (FIG. 2) when the arm 41 is in contact with the stop pin 43, the locking 44 is displaced onto the back part of carriage 7 into aperture 46, thus locking by itself and also allowing the changing of position. When the carriage 7 has attained its position, the arm 41 disengages from the pin stop 43 by a backward movement, and the locking simultaneously occurs in the second position. The different locking and stop means are controlled by a microcontact placed along the cam surfaces and operated by electromagnets. The locking occurs through the introduction of the pin 44 in the aperture 46 (FIG. 2). In addition, it is pointed out that the vacuum may be brought about by any suction device placed in the duct 47 (FIG. 4).

When the operation cycle is finished and the support member is in the position 1g or 1f, the cut and packed sausages are recovered and continue their treatment. The dry sausage is made in a casing of a regular form allowing afterwards application of a vacuum in conditions which will be described later on. The vacuum quality must be excellent for reasons of preservation.

The sausage is stocked in such condition that the extremities do not take a too elongated form. After drying, the sausage is peeled off.

The present process then takes place, which allows the process building up the sausage so that the slices are superposed in their initial position, thus enabling an accurate and perfect contact of the slices and the building up again of the regular shape which has been previously mentioned. The present device allows the regular building up again which is necessary for satisfactory preservation of the sausage.

The sliced sausage filling is introduced into a thermoshrinkable skin whose diameter is slightly larger than that of sausage filling thus making the introduction possible.

The sausage is recovered and placed in an apparatus under a vacuum and in which the second extremity of the skin is closed, in any known way. Nevertheless, the closing of these extremities is made on the skin in order to bring about the adherence of the skin to the conical and rounded shape of the extremities of the sausage.

This precaution is necessary for good preservation of the product. As a matter of fact, it has been stated, for example, that a flat covering does not allow the desired preservation. The sausage is then placed in a hot water bath (about 95°) or in a current of hot air so that the thermo-shrinkable skin is shrunk and the adherence of the skin on all the parts of the sausage is improved.

This shrinking must be made by a very quick pass so that only the skin absorbs the heat, the sausage itself being unable to take a high temperature without risking the melting of the fat. After cooling, the sausage is ready for marketing.

What is claimed is:

1. An apparatus for filling a sausage casing with a sliced sausage filling comprising, a carriage having an elongated hole and a slot extending transversely of and communicating with the hole, means for positioning a sausage casing in the hole with an open end of the casing adjacent the slot, means for maintaining the casing in the hole, means for intermittently feeding a sausage filling through the hole and past the slot into the sausage casing through said open end of the casing, a cutter, a cutting edge portion of said cutter extending into the slot to slice the sausage filling before entry of the sausage filling into the sausage casing, and means for discharging the sausage casing filled with sliced sausage filling from the hole in the carriage.

2. An apparatus according to claim 1, including a generally channel-shaped support member having opposed side flanges and a web interconnecting said side flanges, guides extending between the side flanges and guiding the carriage slidably supported thereon, means moving the carriage between a first position in which the hole is in alignment with the sausage casing positioning means and a second position in which the hole is in alignment with the sausage filling feeding means, the sausage casing positioning means and the sausage filling feeding means, each having the form of an elongated bar slidable axially within the hole, the sausage filling feeding bar being slidable in the hole to discharge the sausage casing filled with sliced sausage filling from the hole, and the bars being mounted on the support member for sliding movement in a direction substantially at right angles to the direction of movement of the carriage.

3. An apparatus for filling a sausage casing with a sliced sausage filling comprising, a generally channel-shaped support member having a web interconnecting opposed side flanges, guides extending between the side flanges, a carriage slidably supported on the guides, the carriage having a hole and a slot extending transversely of, and communicating with the hole, means for positioning a sausage casing in the hole with an open end of the casing adjacent the slot, means for maintaining the casing in the hole, means for intermittently feeding a sausage filling through the hole and past the slot, into the sausage casing through the open end of the casing and then discharging the sausage casing filled with sliced sausage filling from the hole, a cutter, a cutting edge portion of said cutter extending into the slot to slice the sausage filling before entry of the sausage filling into the sausage casing, means moving the carriage between a first position in which the hole is in alignment with the sausage casing positioning means, and a second position, in which the hole is in alignment with the sausage filling feeding means, the sausage casing positioning means and the sausage filling feeding means each being slidably mounted on the support member for movement in a direction substantially at right angles to the direction of movement of the carriage.

4. An apparatus according to claim 3, wherein the carriage includes a guide blick for engaging the guides and a member rigidly attached to the guide block for movement therewith and defining a chamber, the guide block and member having axially aligned through bores which define said hole in the carriage, said slot being formed in the guide block, the through bore of the member being provided with apertures in its side wall which communicate with said chamber in the member, and means for connecting said chamber to means for reducing the pressure in the chamber for maintaining the casing in the through bore.

5. An apparatus according to claim 3, wherein the sausage casing positioning means and the sausage filling feeding means are in the form of elongated bars each mounted on the support member for sliding movement in a direction substantially at right angles to the direction of movement of the carriage, and a container having a through hole for receiving sausage filling, means mounting the container on the support member relative to the sausage filling feeding bar in a position in which one end of the bar remains in the through hole of the container for preventing the sausage filling from passing through the through hole prior to feeding of the sausage filling by the bar.

6. An apparatus for filling a sausage casing with a sliced sausage filling comprising, a movable endless conveyor, a plurality of substantially identical, spaced, support members mounted on the conveyor for movement therewith, each support member having opposed side flanges and a web interconnecting said opposed side flanges to define a generally channel-shaped, guides extending between the side flanges, a guide block slidably supported on the guides, said guide block having a through bore, a member rigidly attached to the guide block for movement therewith and defining a chamber, said member having a through bore in axial alignment with the through bore of the guide block, said guide block having a slot extending transversely of and communicating with the through bore in the guide block, a first elongated bar for positioning a sausage casing in the through bore of the member with an open end of the casing adjacent the slot in the guide block, the through bore of the member being provided with apertures in its side wall which communicate with said chamber in the member, connection means communicating with said chamber for connection to means for reducing the pressure in the chamber for maintaining the sausage casing in the through bore of the member, means mounting said first bar for sliding movement on the support member, a second elongated bar for intermittently feeding a sausage filling through the through bore of the guide block, past the slot, into the sausage casing through the open end of the casing and then discharging the sausage casing filled with sliced sausage filling, from the through bore of the member, means mounting said second bar spaced from the first bar and mounted for sliding movement on the support member, means moving the guide block between a first position in which the aligned through bores of the guide block and the member are in alignment with the first bar and a second position in which the through bores are in alignment with the second bar, and cutter means having a cutting edge portion exiting into the slot to slice the sausage filling before entry of the sausage filling into the sausage casing.

7. An apparatus according to claim 6, wherein cooperating means are provided on the guide block and on the support member for releasably locking the guide block in the first and second positions.

8. An apparatus according to claim 6, wherein a cam surface is provided adjacent the endless conveyor belt for each of the first and second bars, each bar having means engaging its respective cam surface whereby the cam surface controls the movement of the bar relative to the support member.

9. An apparatus according to claim 6, wherein said cutter means comprises three spaced rotatable, circular cutters adjacent the endless conveyor.

10. An apparatus according to claim 6, wherein said connection means communicating with said chamber comprises a hollow resilient beak-like arm, and conduit having two resilient lips between which said arm extends for communicating with said conduit.

11. An apparatus according to claim 10, wherein the length of each lip and the conduit corresponds to the length of the cutter and to the penetration time of the sliced sausage filling in the sausage casing.

12. An apparatus according to claim 6, wherein said guide block has a stop pin and wherein said means moving the guide block between the first position and second position comprises fixed and movable stop means adjacent the endless conveyor for engaging said stop pin on the guide block during movement of the support member on the endless conveyor and causing sliding movement of the guide block on the guides between said first and second positions.

* * * * *